United States Patent
Angermann et al.

(10) Patent No.: US 11,975,575 B2
(45) Date of Patent: May 7, 2024

(54) TRAILER COUPLING HAVING A BALL NECK AND A COUPLING BALL, AND METHOD FOR PRODUCTION THEREOF

(71) Applicant: WESTFALIA-AUTOMOTIVE GMBH, Rheda-Wiedenbrück (DE)

(72) Inventors: Kay Angermann, Döbeln (DE); Michael Drücker, Gütersloh (DE); Waldemar Gross, Münster (DE); Marc Weiner, Gütersloh (DE); Martin Wyrwich, Rheda-Wiedenbrück (DE)

(73) Assignee: WESTFALIA-AUTOMOTIVE GMBH, Rheda-Wiedenbrück (BE)

( * ) Notice: Subject to any disclaimer, the term of this patent is extended or adjusted under 35 U.S.C. 154(b) by 520 days.

(21) Appl. No.: 16/483,831

(22) PCT Filed: Feb. 10, 2018

(86) PCT No.: PCT/EP2018/053368
§ 371 (c)(1),
(2) Date: Aug. 6, 2019

(87) PCT Pub. No.: WO2018/153704
PCT Pub. Date: Aug. 30, 2018

(65) Prior Publication Data
US 2020/0001670 A1 Jan. 2, 2020

(30) Foreign Application Priority Data

Feb. 23, 2017 (DE) .................... 10 2017 103 740.3
Jul. 28, 2017 (DE) .................... 10 2017 117 168.1

(51) Int. Cl.
*B60D 1/06* (2006.01)
*B60D 1/52* (2006.01)
(Continued)

(52) U.S. Cl.
CPC ............ *B60D 1/065* (2013.01); *F16C 11/069* (2013.01); *B60D 1/52* (2013.01); *B60R 9/06* (2013.01); *B62D 25/209* (2013.01); *B62D 29/001* (2013.01)

(58) Field of Classification Search
CPC .. B60D 1/065; B60D 1/52; B60D 1/06; F16C 11/069; B60R 9/06; B62D 25/209; B62D 29/001
(Continued)

(56) References Cited

FOREIGN PATENT DOCUMENTS

CN 103963584 A 8/2014
DE 202010008924 U1 * 2/2012 ............... B60D 1/06
(Continued)

OTHER PUBLICATIONS

Honicke, Support Component of a Trailer Coupling or a Load Bearer, Jul. 23, 2014, EP 2353892 Machine Translation, 5 Pages.*
(Continued)

*Primary Examiner* — Kevin Hurley
*Assistant Examiner* — Felicia L. Brittman

(57) ABSTRACT

A trailer coupling for a motor vehicle comprises a coupling arm, on the free end region of which a ball neck is formed, on which a coupling ball is arranged. The coupling ball is spherical on the side facing away from the ball neck and has a spherical segment plane on the side facing the ball neck. Between the spherical segment plane and a portion of the ball neck has a smaller outer circumference than the spherical segment plane there is arranged a throat portion having a transition contour extending in a concave manner between the ball neck and the spherical segment. The transition contour transitions with a coupling ball transition region into an external contour of the coupling ball and transitions with a ball neck transition region into an outer surface of the ball
(Continued)

Figure 1:
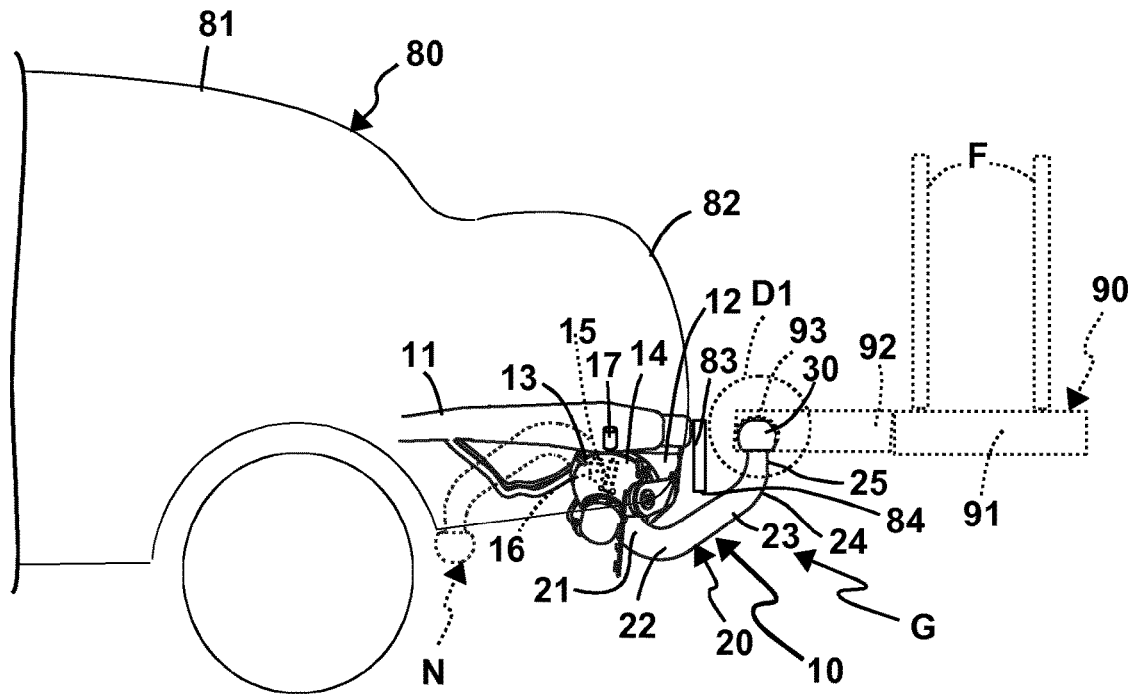

neck. The transition contour has a curved configuration having a non-constant radius.

7 Claims, 3 Drawing Sheets

(51) Int. Cl.
    *B60R 9/06*          (2006.01)
    *B62D 25/20*        (2006.01)
    *B62D 29/00*        (2006.01)
    *F16C 11/06*        (2006.01)

(58) Field of Classification Search
    USPC ......................................................... 280/512
    See application file for complete search history.

(56) References Cited

FOREIGN PATENT DOCUMENTS

| | | | |
|---|---|---|---|
| DE | 202010008924 U1 | 2/2012 | |
| EP | 2353892 B1 * | 7/2014 | ............... B60D 1/06 |
| EP | 2353892 B1 | 7/2014 | |
| EP | 3127725 A1 * | 2/2017 | ............... B60D 1/06 |
| EP | 3127725 A1 | 2/2017 | |
| WO | 2014165922 A1 | 10/2014 | |

OTHER PUBLICATIONS

Translation of International Search Report dated Jun. 6, 2018; International Patent Application No. PCT/EP2018/053368 filed Feb. 10, 2018. ISA/EP.

* cited by examiner

TRAILER COUPLING HAVING A BALL NECK AND A COUPLING BALL, AND METHOD FOR PRODUCTION THEREOF

CROSS-REFERENCE TO RELATED APPLICATION

This application is a 35 U.S.C. § 371 national stage application of PCT Application No. PCT/EP2018/053368 filed on Feb. 10, 2018, entitled "TRAILER COUPLING HAVING A BALL NECK AND A COUPLING BALL, AND METHOD FOR PRODUCTION THEREOF," which claims priority to German Patent Application No. 10 2017 103 740.3 filed on Feb. 23, 2017, and German Patent Application No. 10 2017 117 168.1 filed Jul. 28, 2017, each of which are incorporated herein in their entirety by reference.

The invention relates to a trailer coupling for a motor vehicle, wherein the trailer coupling has a coupling arm, on the free end region of which a ball neck is formed, on which a coupling ball is arranged for attaching a trailer or coupling a load carrier to the motor vehicle, wherein the coupling ball is spherical on the side thereof facing away from the ball neck and has a spherical segment plane on the side thereof facing the ball neck, wherein between the spherical segment plane and a portion of the ball neck which has a smaller outer circumference than the spherical segment plane there is arranged a throat portion having a transition contour extending in a concave manner between the ball neck and the spherical segment, the transition contour transitioning with a coupling ball transition region into an external contour of the coupling ball, in particular into the spherical segment plane, and transitioning with a ball neck transition region into an outer surface of the ball neck. The invention also relates to a method for production of such a trailer coupling.

A typical standardised ball bar or ball bar neck is designed according to ISO 1302 and ECE-R 55. The coupling ball has a nominal diameter of, by way of example, approximately 50 mm, with the ball neck having a diameter of 29 mm. The coupling ball generally has a flattened top surface and a lower spherical segment plane, designed as a ring surface area. A throat normally extends between the ring surface area and the cylindrical outer circumference of the ball neck. While the coupling ball in itself and the ball neck also, taken in isolation, are relatively robust, under high loads in the region of the throat portion or in the transition from coupling ball to throat portion or ball neck to throat portion high bending stresses occur, which can lead to the collapse and rupturing of the coupling arm.

To solve this problem, on a trailer coupling of the above-mentioned type, it is provided that the transition contour has a curved configuration with a non-constant radius and/or with at least two radii that differ from one another.

The non-constant radius can thus, by way of example, comprise two or more radii that differ from one another or the curved configuration can be formed by two of more radii that differ from one another. The radii preferably transition tangentially and/or smoothly into one another.

Here it is advantageous if the radii in the region of the spherical segment plane are smaller than in the region of the ball neck.

The trailer coupling according to the invention is expediently suitable for the ball-and-socket type mounting of a trailer ball coupling. A hitch socket or spherical mounting contour of the trailer ball coupling can be positioned on the coupling ball in a manner known per se and then mounted in a ball-and-socket manner. But a load carrier can also be placed on the coupling ball and braced against the trailer coupling.

The free end region of the coupling arm, namely the ball neck and the coupling ball are expediently in one piece or made or produced from one piece. An arm body supporting the ball neck, considered in more detail below, can also form a single piece with the ball neck and coupling ball. But it is also possible for the arm portion to be formed by a first body and the ball neck and the coupling ball by a second body, which are connected together, by way of example screwed, welded, glued or similar.

The ball neck and the coupling ball are expediently rotationally symmetrical. In particular, they are symmetrical about the same axis of rotation.

For connecting the ball neck to an arm portion, a screw thread can be provided, arranged on the free end region or on the region of the ball neck facing away from the coupling ball. However, the region of the ball neck facing away from the coupling ball can also be a plug-in body for plugging into or positioning on a suitable socket opening.

For its part, the arm body, on which the ball neck and the coupling ball are arranged can, but need not, be rotationally symmetrical. In particular, on the arm body reinforcements, reinforcing ribs, indentations, recesses or similar can be arranged or provided.

The coupling ball and the ball neck can, by way of example, be manufactured in a casting process. However, deformation of a blank, in particular in the region of the transition contour, is preferred for formation of coupling ball and ball neck.

The method according to the invention for producing a trailer coupling for a motor vehicle, wherein the trailer coupling has a coupling arm, on the free end region of which a ball neck is formed, on which a coupling ball is arranged for attaching a trailer or coupling a load carrier to the motor vehicle, wherein the coupling ball is spherical on the side thereof facing away from the ball neck and has a spherical segment plane on the side thereof facing the ball neck, wherein between the spherical segment plane and a portion of the ball neck which has a smaller outer circumference than the spherical segment plane there is arranged a throat portion having a transition contour extending in a concave manner between the ball neck and the spherical segment, the transition contour transitioning with a coupling ball transition region into an external contour of the coupling ball, in particular into the spherical segment plane, and transitioning with a ball neck transition region into an outer surface of the ball neck, provides for cutting by machining and/or deformation, in particular forging and/or profiling and/or rolling, of a blank to form the throat portion such that the transition contour has a curved configuration with a non-constant radius. The rolling or profiling can, by way of example, also comprise what is known as round shaping or round profiling. Round shaping and round profiling can also be referred to or performed as cross rolling or transverse profiling.

The coupling arm can be produced at least partially by longitudinal rolling of a blank along its direction of longitudinal extension. Then the, as it were, semi-finished blank can be further brought into its final form by, for example, machining and/or by round shaping.

The blank can or may be machined in the above manner only in the region of the ball neck and the coupling ball.

It is a basic concept of the present invention, that instead of a typically constant radius, namely a radius of the transition contour between the cylindrical ball neck and the underside of the coupling ball, thus the spherical segment plane, a curved configuration having a non-constant radius is provided. In this way, a relatively smooth progression between on the one hand the ball neck and/or on the other the throat portion and the coupling ball can be achieved. Hard or sharp transitions between the "hollow throat" of the throat portion and the coupling ball and/or the ball neck can be avoided. Furthermore, in this way the cross-sectional area of the throat portion can be larger, increasing the load-bearing capacity of the coupling arm.

In the method according to the invention, it is advantageous if, by way of example, what is known as stretch rolling, profiling, rolling or similar takes place, allowing relatively gentle machining of the microstructure of a blank, while protecting the material.

It is also expedient if the method provides for hot working, by way of example upsetting and/or forging. It is obviously advantageous, if the machining, profiling, rolling or similar takes place with the blank still at least warm, semi-hot or preferably hot.

By means of the non-constant curved configuration of the transition contour, by way of example local notch stresses on what are known as geometric angles and/or notches can be avoided or significantly reduced. The transition contour is matched to the loading of the coupling arm. In particular, the transition contour has a structure that can cope with the loading and is matched to the stress distribution during use of the trailer coupling by a trailer or load carrier.

An advantageous concept provides that the transition contour in the coupling ball transition region, by way of example directly adjoining the coupling ball, has a larger radius or several larger radii than in an intermediate portion between the transition regions. The other transition region, namely the ball neck transition region, by way of example directly adjoining the ball neck or also remote from this, also expediently has a larger radius than an intermediate portion of the transition contour between the transition regions. Thus, it is possible for the transition contour between the transition regions to have a relatively small radius, while in the transition regions it extends smoothly away with a large radius towards the coupling ball or towards the coupling arm or the arm body of this.

At this point it is worth mentioning that the radii at immediately adjacent points of the transition contour may differ from one another. But it is also possible for a number of points or a linear portion or contour portion of the transition contour to have a constant radius, while adjacent regions of the transition contour have one or more different radii.

It is preferable if the transition contour has a number of radii that differ from one another.

It is also advantageous if the transition contour is designed as a spline contour or a polynomial line. A spline or polynomial line is a function defined piecewise by polynomials of a maximum of the $n^{th}$ degree. Junctions or nodes, where two polynomial parts or polynomial portions collide, must meet certain conditions, by way of example that the spline or polynomial line can be (n−1) times continuously differentiable.

It is also advantageous if the transition contour at all points along its course can be continuously differentiable at least once. But it is also possible for the transition contour to substantially be continuously differentiable at least once. It can also be provided that only or also in the ball neck transition region or the coupling ball transition region or both, the characteristic is achieved of the transition contour being continuously differentiable at least once. The intention is consequently to stress that the transition contour advantageously has a continuous course without corners or angles.

It is also advantageous, if the transition contour transitions tangentially or without an angle into the spherical segment plane and/or the ball neck. The transition contour thus, as it were, transitions smoothly into the spherical segment plane or the ball neck. A kink or angle may cause a localised notch stress, leading to a lower load-bearing capacity of the coupling arm.

The transition contour can have just one curvature or just one direction of curvature. But it is also possible for the transition contour to have at least two or more curvature portions, curving in opposite directions. It is possible, by way of example, for the transition contour to have at least one S-shaped portion or wavelike portion or be completely S-shaped or wavelike.

The transition contour can, as it were, have a steady course and uniform curvatures. But it is also possible for the transition contour to have a waisting between the transition regions.

The throat portion can have only outer circumferences which are larger than its outer circumference of the ball neck. In this way it is possible to achieve matching between the ball neck with a smaller diameter and the coupling ball without problems. But it is also possible for the throat portion to have at least one outer circumference that is smaller than its outer circumference of the ball neck. In this way, therefore, the throat portion can, by way of example, have a kind of waisting or narrowing.

The ball neck be designed as a continuous cylinder, in particular as a circular cylinder. But it is also possible for the ball neck to have a waisting. The waisting is, by way of example, rounded. It is also advantageous, if the transition contour extends as far as a minimum outer circumference, in particular a diameter of the ball neck. It is therefore also possible for the ball neck as such to have a smaller outer circumference or a smaller cross-sectional area in the region adjacent to the transition contour.

The waisting or narrowing of the ball neck is expediently designed in such a way that it varies within predetermined and/or standardised tolerances. Thus, by way of example, a maximum diameter of the ball neck of 29 mm is defined, while the waisting or narrowing can be a maximum of 2 mm, so that the diameter of the waisting or the diameter of the ball neck in the region of its smallest diameter is a minimum of 27 mm. At a largest diameter, the ball neck has, by way of example, a diameter of approximately 28-29 mm, while the smallest diameter, in particular in the region of the waisting, is only 27-28 mm.

The ball neck is expediently arranged on an end region of an arm body, the other end region of which is designed and provided for connection with the motor vehicle. By way of example, a mount is provided for connection with the motor vehicle, for example a hanger bracket, a bearing, a socket opening or similar. The coupling arm or arm body expediently has a bearing element for movable supporting on the mount or a plugging contour for plugging into the mount. It is also possible for screw holes or similar other retaining contours to be provided on the coupling arm or the arm body for fastening to the mount.

The arm body has one or more curvatures or bends for matching to a bodywork structure or bumper contour of the motor vehicle. Thus, the arm body is the component or the portion of the coupling arm which, as it were, creates the connection between the ball neck and the motor vehicle. The arm body is expediently a solid component compared to the ball neck.

It is preferable if the arm body and/or the ball neck and/or the coupling ball are a single piece and/or are manufactured from the same blank.

While it is advantageous for the ball neck if it has a circular cross section or is cylindrical, it is possible for the arm body to have a substantially non-circular-shaped cross section. By way of example, the arm body has ribbings, support structures or similar, which are not provided on the ball neck.

It is also advantageous for the arm body to have a larger cross-sectional area than the ball neck directly next to the ball neck. The load-bearing capacity of the arm body is expediently very high.

In the vicinity of the throat portion, the ball neck expediently has a smaller outer circumference, by way of example a smaller diameter, than in a region remote from the throat portion. Thus, the ball neck can, by way of example, extend in the nature of a truncated cone or similar in the direction of the throat portion.

The outer surface of the ball neck directly next to the throat portion or the ball neck as a whole is expediently configured as a cylinder surface of a circular cylinder.

The ball neck is advantageously entirely or preferably substantially designed as a circular cylinder.

The spherical segment plane can be a purely geometrical plane, meaning that it is not designed as a freestanding surface. In the spherical segment plane, however, an outer surface of the coupling arm can be provided or configured. By way of example, it is provided that in the spherical segment plane a ring surface area is provided, the external diameter of which adjoins the spherical ball surface of the coupling ball and the internal diameter or inner circumference of which adjoins the coupling ball transition region or transitions into the coupling ball transition region. So consequently a ring surface area is provided for rear or bottom engagement with, by way of example, a load carrier.

In the spherical segment plane, a flat surface is expediently provided or the spherical segment plane is designed as a flat surface. By way of example, the abovementioned ring surface area is designed as a flat surface.

The coupling ball transition region expediently has a recess extending behind the spherical segment plane away from the ball neck. By way of example, the recess is designed as a kind of undercut or rear engagement.

The result of this is, by way of example, an overall S-shaped course of the transition region. Thus, the transition contour has, by way of example, in the rear engagement region or the recess an S-shaped course. The abovementioned curvatures or bends going in opposite directions run, by way of example, in the spherical segment plane or about the spherical segment plane of the coupling ball. An undercut is, by way of example, a removal on a rotationally symmetrical inside edge with a certain shape and stated dimensions, which gives the tool flexibility when used in production.

But it is also possible for an S-shaped course or a course of the transition contour with curvatures in opposite directions close to the ball neck, in particular in the transition region to the ball neck, to be provided.

On its region facing away from the ball neck, the coupling ball is expediently flattened. By way of example, the coupling ball has a flat surface running parallel to the spherical segment plane.

The coupling ball can expediently be designed as a spherical segment ball, which has a flattened area on each of its region facing away from the ball neck and its region facing towards the ball neck, in particular a flat surface.

The flattened areas can, by way of example, serve as positioning aids or support surfaces for a load carrier.

The coupling ball and/or the ball neck and/or the throat portion are expediently produced by deformation. Forging, upsetting, rolling or profiling are particularly suitable for deformation. As mentioned, the deformation expediently takes place in the warm, especially in the hot state of a blank for production of the coupling arm.

But machining by cutting a blank at least section by section is also perfectly possible for producing the coupling arm.

Production of the coupling arm is preferably carried out so that the base material of the throat portion has a microstructure with substantially or exclusively uninterrupted or intact fibre flows. Directly through said hot working, rolling, in particular stretch rolling or similar, such an, as it were, intact microstructure cam be maintained. The coupling arm, in particular in the region of the coupling ball and the throat portion and ball neck below this, is more robust than known coupling arms.

The spherical segment plane is expediently at right-angles to a longitudinal axis of the ball neck.

The ball neck and the coupling ball are preferably made of metal, in particular steel or aluminium. It is particularly advantageous if the coupling arm as a whole, or at least in the portion where it is joined or integral with the ball neck and the coupling ball, is made of steel or aluminium.

Preference is, by way of example, for what are known as structural steel, high-strength materials, by way of example from the group of heat-treatable steels or precipitation-hardening ferritic-pearlitic steels or AFP-steels. Bainitic steels are similarly advantageous.

Figure 2:
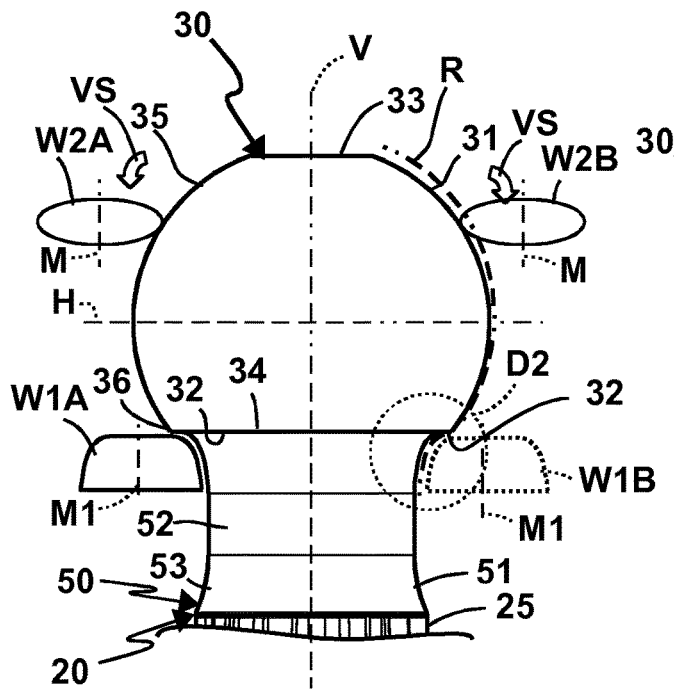
Figure 3:
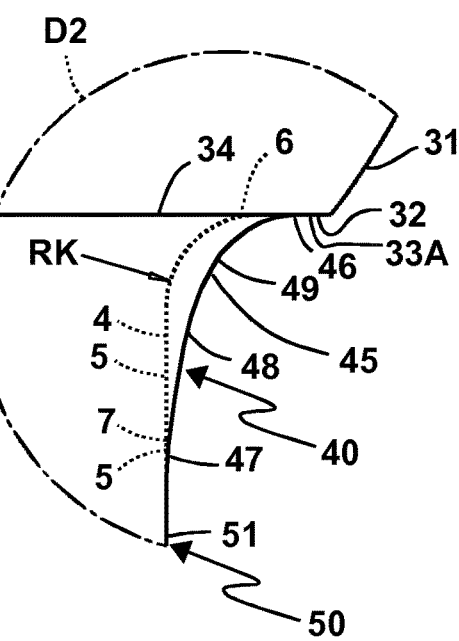
Figure 4:
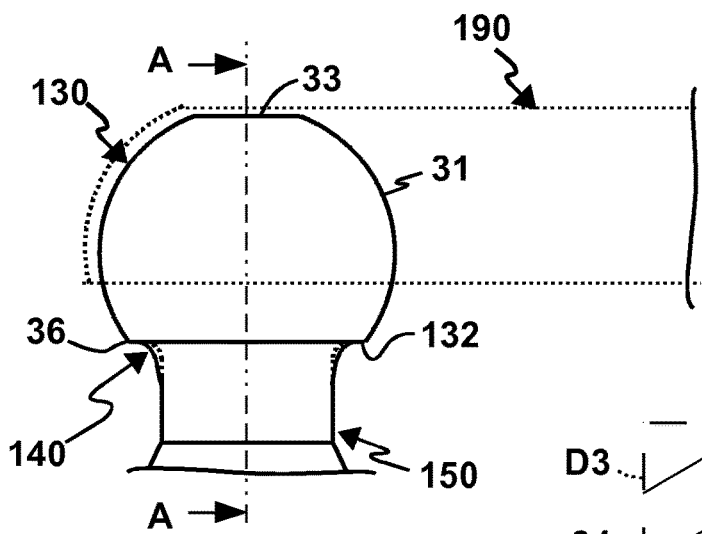
Figure 6:
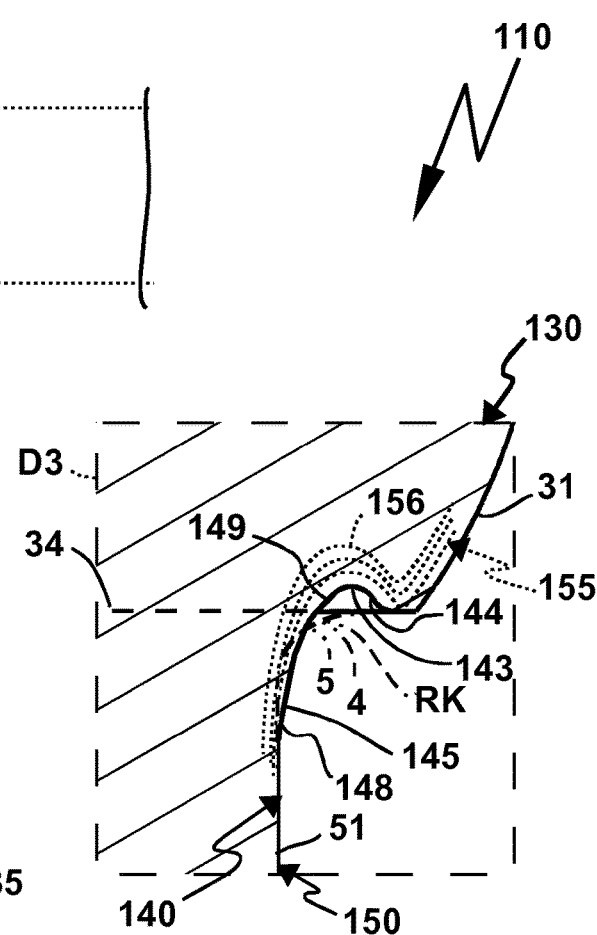
Figure 5:
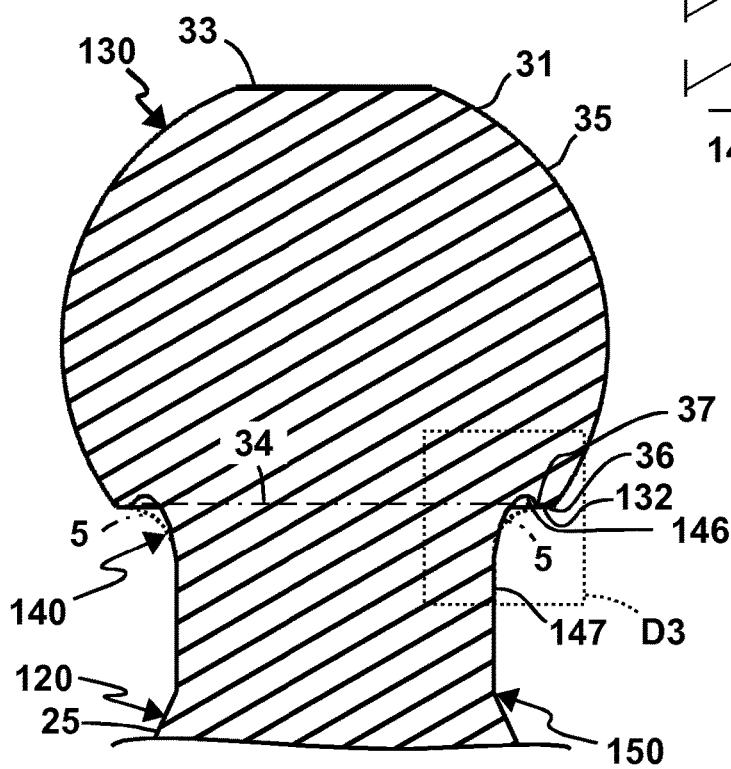
Figure 7:
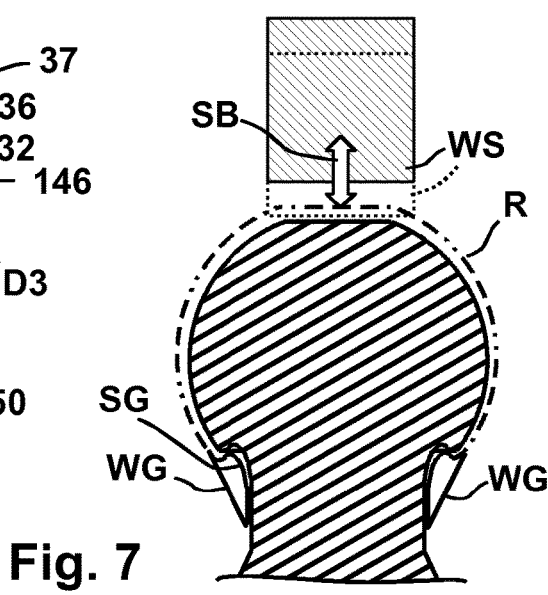
Figure 8:
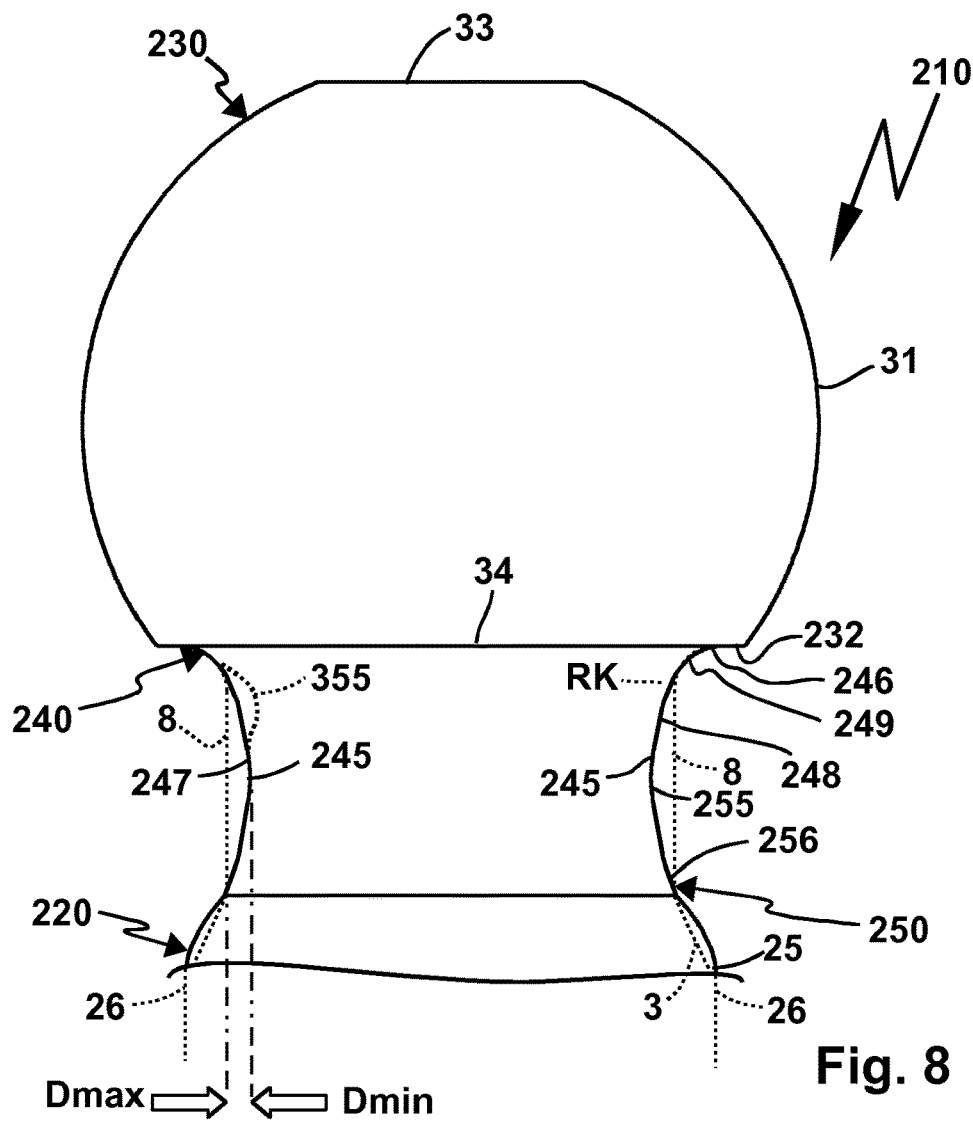
Figures 9, 10:
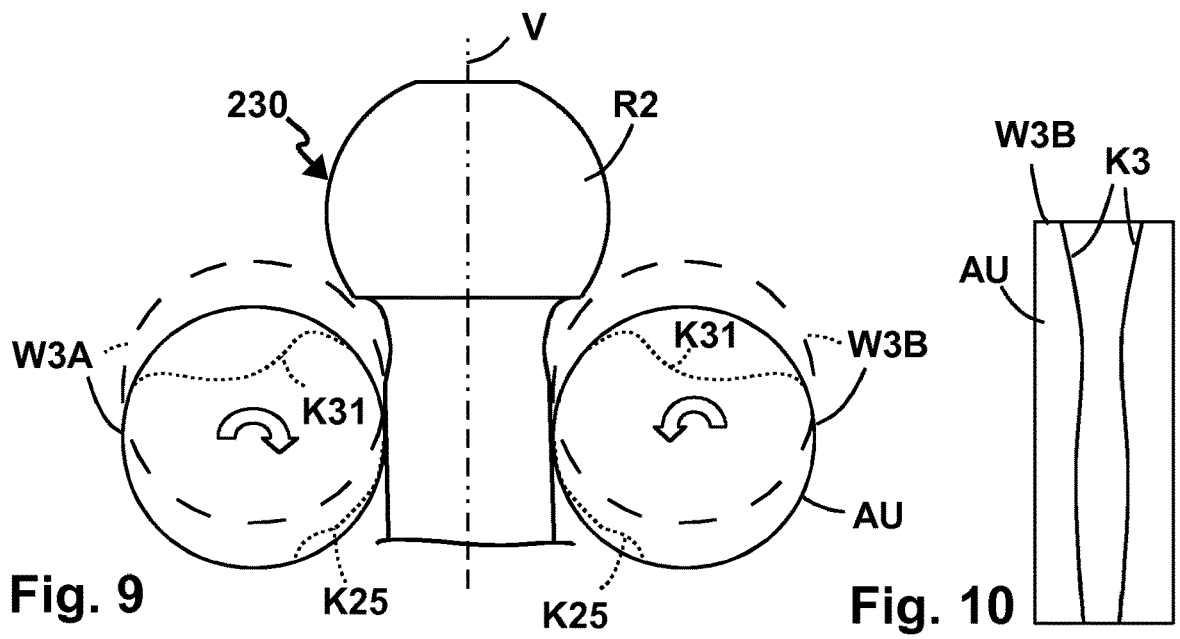

Exemplary embodiments of the invention are described in the following using the drawing. This shows as follows:

FIG. 1 a partially schematic side view of an arrangement comprising a motor vehicle and a load carrier, arranged on a trailer coupling according to the invention;

FIG. 2 a detail D1 from FIG. 1;

FIG. 3 a detail D2 from FIG. 2;

FIG. 4 a further exemplary embodiment of a trailer coupling according to the invention, shown in FIG. 5 in a cross section A-A according to FIG. 4;

FIG. 6 a detail D3 from FIG. 5;

FIG. 7 a schematic representation of a machining of the trailer coupling according to FIG. 5;

FIG. 8 a further exemplary embodiment of a trailer coupling according to the invention; and FIG. 9 a schematic representation to illustrate a longitudinal rolling of a blank for production of, by way of example, the coupling arm according to FIG. 8;

FIG. 10 a schematic top view of rolling of the arrangement according to FIG. 9.

A trailer coupling 10, 110, 210 is, by way of example, arranged on a motor vehicle 80. A load carrier 90 or a trailer 190 (shown schematically in FIG. 4) can be coupled to the trailer coupling 10, 110, 210, so that, by way of example, a load, in particular bicycles F, or also loads to be transported on a trailer 190, can be transported by the motor vehicle 80. The motor vehicle 80 is, by way of example, a motor vehicle with a combustion engine, electric motor or hybrid motor. In any event, the load capacity or transport capacity of the motor vehicle 80 can be increased by the load carrier 90 or a trailer 190.

The trailer coupling 10 comprises, by way of example, a carrier arrangement 11, that can be secured to bodywork 81 of the motor vehicle 80. The carrier arrangement 11 comprises, by way of example, a cross beam and side supports or longitudinal supports, which can be secured to the bodywork structure of the bodywork 81, by way of example by screwing.

A mount 12 for the trailer coupling 10 is secured to the carrier arrangement 11. The mount 12 supports or retains a coupling arm 20. The coupling arm 20 can be adjusted by means of a bearing 13 between a use position G shown in FIG. 1, in which the coupling arm 20 protrudes substantially in front of a bumper 83 of the motor vehicle 80, and a non-use position N, where it is in particular positioned hidden behind the bumper 83 on the motor vehicle 80. In the use position G and preferably in the non-use position N, the coupling arm 20 is lockable by means of a locking device, by way of example by means of positive locking or similar. By means of a drive 16, the coupling arm 20 can be unlocked, in order to be adjusted between the use position G and the non-use position N, by way of example swivelled or linearly displaced or both. Consequently, the bearing 13 is, by way of example, a swivel bearing, sliding bearing or pivot sliding bearing. But this is not absolutely essential. The coupling arm 20 can also be held securely on the mount 12, by way of example by means of screwing, or can be releasably connectable by means of a plug connection to the mount 12.

For adjustment between the use position G, and the non-use position N, a drive 17 is preferably provided, which can also be referred to as a slewing drive.

The coupling arm 20 comprises an arm body 26 with an end region 21, provided for connecting with the mount 12. By way of example, the arm body 26 is firmly attached to a bearing element 14, by way of example a bearing head, in particular as one piece. The bearing element 14 is supported on the mount 12 by way of example by means of a bearing bolt so that it can swivel and/or slide.

A curved portion 22 connects to the end region 21. The curved portion 22 serves, as it were, to allow the coupling arm 20 in the use position G below the bumper 83 to protrude outwards and upwards.

A substantially straight arm portion 23 connects to the curved portion 22, transitioning into a further curved portion 24. It can be seen that the curved portions 22, 24 allow an adaptation to an external contour of the motor vehicle 80 to be achieved, so that ultimately a coupling ball 30, arranged on the curved portion 24 of the end region 25 of the coupling arm 20 connected to the coupling arm 20, has an alignment oriented upwards and suitable for attaching a trailer or coupling a load carrier, by way of example the load carrier 90. The curved portion 22 serves, for example, for adaptation to a bumper contour 84 of the motor vehicle 80.

A load carrier coupling 93 of the load carrier 90, with which the load carrier 90 is secured to the trailer coupling 10, in particular the coupling ball 30, acts during travel operation of the motor vehicle 80 with coupled load carrier 90 with great force on the coupling arm 20, in particular in the region of the end region 25. There, a ball neck 50 with a substantially cylindrical design is provided, which in itself in this, as it were, slim or narrow form is unnecessary for operation with the load carrier 90, but is necessary for operation with a trailer or what is known as a ball coupling. In order that this actually has sufficient rotatability like a ball joint on the coupling ball, below the coupling ball 30 a suitable clearance is present, provided by the ball neck 50, the external diameter of which is smaller than that of the coupling ball 30.

On the support structure 91, by way of example a carrying frame, of the load carrier 90 for one or more bicycles is secured or can be secured, wherein by way of example these may also be electric bicycles. There are also load carriers which can carry up to four bicycles. The load acting on the load carrier 90 and via corresponding lever forces on the coupling arm 20, in particular the ball neck 50 and the transition between ball neck 50 and coupling ball 30, is correspondingly heavy. The effect is further intensified by the fact that the load carrier 90 protrudes well beyond the rear 82 of the motor vehicle 80, by way of example because the load carrier coupling 93 is arranged on a corresponding elongated carrier projection 92. In practice this can lead, by way of example, to the coupling ball 30 breaking off from the ball neck 50.

To avoid such a situation, with the trailer couplings 10, 110, 210 corresponding measures are taken. It has to be said that in each of the three exemplary embodiments the coupling ball 30, 130, 230 has basically the same design as does the coupling arm 20, 120, 220. The ball necks 50, 150, 250 of the trailer couplings 10, 110, 210 are of different types. The same or similar portions or components of the coupling arms 20, 120, 220 are denoted by the same reference numerals.

However, a detailed description will be provided of the deviating structures between the ball neck 50 and the coupling ball 30 of trailer coupling 10 and the ball neck 150 and the coupling ball 130 of trailer coupling 110 and finally between the ball neck 250 and the coupling ball 230 of trailer coupling 210. The coupling arms 20, 120, 220 in each case comprise the arm body 26. Obviously, the special contour and design of the arm body 26 should not be understood to be restrictive. Other geometries and courses are perfectly possible, depending on the motor vehicle on which it is intended to use the coupling arm. The swivel mounting of the coupling arm 20, 120, 220 on the motor vehicle 80 is just one option and is not compulsory.

The coupling balls 30, 130, 230 are in principle subsegment balls. On a side facing away from the ball neck 50, 150, 250 the coupling balls 30, 130, 230 are flattened and have, by way of example, a flat or support surface 33. Between the flat surface 33 and a spherical segment plane 34, a spherical ball surface 31 extends, on which a trailer can be supported like a ball joint in a ball-and-socket manner. By way of example, the coupling ball 30 has a diameter of 50 mm in the region of the ball surface 31.

The spherical segment plane 34, as is the case in the exemplary embodiments according to FIGS. 1 to 8, can be designed as a flat surface. By way of example, a ring surface area 32 is configured there. An external diameter 36 of the ring surface area 32 forms, as it were, an outer edge of the spheroidal or spherical ball surface 31.

The spherical segment plane 34 and the flat surface 33 are parallel to one another.

In the region of the ball surface 31, an external contour 35 of the coupling ball 30, 130, 230 is spheroidal, while in the region of the spherical segment plane 34 a flat surface 33A or even surface can be configured. However, recesses or similar other contours are also possible there as can be seen in the exemplary embodiment according to FIGS. 4, 5, 6.

A throat portion 40, 140, 240 connects the ball neck 50, 150, 250 and the coupling ball 30, 130, 230.

FIG. 3 shows a typical throat portion 4 known from the prior art, having a constant radius RK. The throat portion 4 has a transition contour 5, that in a ball neck transition region 6 transitions into an outer surface 8 of a ball neck 5. The outer surface 8 is designed like a cylinder jacket. The ball neck 3 is cylindrical. In the transition regions 6, 7 notch stresses can be observed which when load is applied lead to the occurrence of cracks or ruptures there.

In the three exemplary embodiments described below, measures are taken against this:

On a throat portion 40 of the coupling arm 20 a transition contour 45 is designed to run flat to the spherical segment plane 34 and to the outer surface 51 of the ball neck 50. The transition contour 45 has a coupling ball transition region 46, where it transitions into the coupling ball 30, and a ball neck transition region 47, constituting the transition to the ball neck 50. Between these a number of very small portions of the transition contour 45 extend, by way of example portions 48, 49, for instance.

The radii of the transition contour 45 are not the same over the entire length of the transition contour 45. The radii of the transition contour 45 preferably differ in each case. With the transition contour 45, for example, three different radii can be provided, in particular a radius of approximately 10-12 mm close to the ball neck 50, a radius of approximately 2-4 mm at the transition region to the spherical segment plane 34 and a radius between the two abovementioned radii of, by way of example, 5-8 mm, in particular approximately 6 mm.

It is preferable if the radii of the transition contour 45 are larger than the constant radius RK. Thus, in particular in the ball neck transition region 47, a significantly larger radius is selected than in the intermediate portions, by way of example portions 48 and 49, of transition contour 45. The radius of the transition contour 45 in the coupling ball transition region 46 is expediently the smallest radius.

The throat portion 40, in the ball neck transition region 47 only, has the same external diameter as the ball neck 50. The external diameters of the throat portion 40 increase continuously as far as the underside of the coupling ball 30 or the spherical segment plane 34.

The transition regions 46, 47 transition tangentially into the spherical segment plane 34 or ring surface area 32 or into the outer surface 51.

In a central portion 52, the ball neck 50 is approximately cylindrical. A foot region 53 on the other hand has an approximately conical or truncated cone shape. So consequently the diameter of the ball neck 50 increases towards the end region 25 of the coupling arm 20.

An exemplary and advantageous production of the contours on the end region of the coupling arm 20, namely in particular of the throat portion 40, is shown schematically in FIG. 2. By way of example, opposing rollers W1A und W1B are provided, the perimeter of which has approximately the form of the transition contour 45. The two rollers W1A and W1B act from opposing sides on the end region of the coupling arm 20 and are supported so that they can rotate about axis of rotation M1. By rotating a blank R which, by way of example, to some extent already has the basic form of the coupling arm 20, and/or by rotating the rollers W1A and W1B about the blank R the transition contour 45 can as it were be rolled. The rolling process takes place, by way of example, about a longitudinal axis V of the blank R.

It is advantageous here if the blank R and/or the rollers W1A and W1B are in the warm or hot state, making deformation or forming of the blank R easier. For the purpose of simplification, the blank R is shown only schematically in the drawing and already extensively corresponds to the already made coupling arm 20.

The coupling ball 30 can also be made by rolling, by way of example by moving rollers W2A and W2B along the ball contour of the ball surface 31, as indicated by arrows VS. Rollers W2A and W2B are opposite one another and are able to rotate about axis of rotation M, wherein the rollers W2A and W2B are able to rotate about the blank R and/or the blank R is rotated between the rollers W2A and W2B. To produce the spherical ball surface 31, the distance between the rollers W2A and W2B is increased as far as a horizontal plane H of the coupling ball 30 and reduced as far as the spherical segment plane 34 and the upper flat surface 33.

Rolling of the blank R by means of rollers W2A and W2B and/or rollers W1A and W1B is, by way of example, referred to as stretch rolling. This rolling can also take place after a production process which will become clearer in relation to FIG. 9. In doing so, the blank R is, by way of example through what is known as longitudinal rolling, initially brought into a basic form, which undergoes more precise contouring by subsequent radial rolling, as described above, and/or by machining.

The throat portion 140 of coupling arm 120 is basically concave in the transition between the ball neck 150 and the coupling ball 130. By way of example, a transition contour 145 runs between the outer surface 51 of the ball neck 150 and the spherical segment plane 34 in a substantially concave manner, namely from the ball neck transition region 147 from curved portions 148, 149 to a recess 143, extending from the ball neck 150 behind the spherical segment plane 34. The recess 143 forms an indentation, undercut or similar.

Starting from the recess 143, the transition contour 145 has a curved portion 144, which is curved in the opposite direction to the curved portions 148, 149. The curved portion 144 runs as far as the spherical segment plane 34, where it transitions into a ring surface area 132. The ring surface area 132 lies in the spherical segment plane 34. The ring surface area 132 has the external diameter 36 and at its internal diameter 37 the curved portion 144 transitions into the ring surface area 132.

FIG. 6 provides a sketch by way of example of the course of a throat portion 4, which would, by way of example, correspond to standard ECE-R 55. It is clear from this that the ball neck transition region 147 transitions tangentially and with a very large radius into the outer surface 51 or the ball neck 150. In any event, this radius is significantly larger than the radius RK of the transition contour 5. The coupling ball transition region 146, which extends starting from the recess 143 as far as far as the ring surface area 132, has narrower radii. Nevertheless, a favourable stress distribution occurs without excessive local notch stresses.

The production process shown by way of example in FIG. 7 for upsetting a blank R by means of an upsetting tool WS can contribute to this. The upsetting tool WS is, by way of example, in the context of a movement SB on the head region, is in particular moved towards the flat surface 33 or front of the blank R and upsets the blank R. In the region of the transition contour 145 or in any event of the throat portion 140, counter-tools WG are provided, the external contour or contact contour or support contour SG of which corresponds to the transition contour 145 in a complementary fashion. The blank R is, as it were, upset against the counter-tools WG.

This advantageously results in a microstructure 155 of the blank R having an almost uninterrupted fibre orientation. Fibres 156 are indicated as an example (see FIG. 6).

Needless to say, the production process used for the coupling arm 20 can also be used for the coupling arm 120 and the upsetting according to FIG. 7 is also possible for the coupling arm 20. For example, it is possible for a coupling arm according to the invention to be initially upset, as shown in FIG. 7, and then further rolled, as shown schematically in FIG. 2. It is also possible for a coupling ball, by way of example the coupling ball 30, 130, 230, of a coupling arm, upset and/or rolled as explained above, to be machined or reworked by cutting, in particular by turning.

A throat portion 240 of the coupling arm 220 runs in the region of the coupling ball 230 similarly to the exemplary embodiment according to FIGS. 1-3.

A coupling ball transition region 246 of a transition contour 245 of the throat portion 240 ruins tangentially to the ring surface area 232 or spherical segment plane 34. Close to the coupling ball transition region 246 a curved portion 249 is provided, having smaller radii than a curved portion 248 connecting thereto, extending as far as the ball neck 250.

The curved portion 248 runs in a ball neck transition region 247 in a waisting 255 of the ball neck 250. In the region of the waisting 255 the ball neck 250 has its minimum diameter Dmin.

Starting from the waisting 255, the diameter of the coupling arm 220 increases continuously as far as the spherical segment plane 34.

In the, as it were, opposite direction, namely towards the end region 25 of the arm portion 26, the diameter of the ball neck 250 also increases. The shell or outer surface of the ball neck 250 has, by way of example, a concave curved portion 256 towards the arm portion 26.

It is preferable if the ball neck 250 has a minimum diameter Dmin, which meets standard Norm ECE-R 55 and/or is a minimum of 27 mm. The maximum external diameter Dmax of the ball neck 250, by way of example close to the coupling ball transition region 246, is preferably a maximum of 29 mm and/or meets standard ECE-R 55.

Starting from the waisting 255, therefore, on the one hand the throat portion 240 transitions with a number of radii that differ from one another tangentially into the spherical segment plane 34, in particular the ring surface area 232, of the coupling ball 230, wherein the ball neck 250, starting from the waisting 255, has a course similar to the throat portion 240 towards the arm portion 26.

It is also possible for a throat portion to have a waisting, as indicated in FIG. 8. By way of example, the transition contour 245 can have a waisting 355. In the region of the waisting 355 an outer circumference of the throat portion or of the transition contour 245 is smaller than the outer circumference of the ball neck 250.

The schematic representation according to FIG. 9 shows a longitudinal rolling of a blank R2 for production, by way of example, of the coupling arm 230. Here, by way of example, the blank R2 is moved along its longitudinal axis or longitudinal extension V between rollers or rolls W3A and W3B and/or the rollers or rolls W3A and W3B are moved along the longitudinal axis V past the blank R2, in order to form at least a basic structure or basic form of the coupling arm 230. Here, on the outer circumference AU of the rollers or rolls W3A and W3B a, by way of example, grooved or ribbed contour K3 can be provided, representing the inverse of the outer circumference of the coupling arm 230 to be produced by the rollers W3A and W3B.

Through suitable dimensioning of the outer circumference of the rollers or rolls W3A and W3B, it is also possible for the contour to have geometrically different cross sections and/or courses, so that in this way, by way of example, the basic contours of the coupling ball 230 and/or of the throat portion 240 and/or of the ball neck 250 can be formed or preformed. On their outer circumference, the rollers then have corresponding contours or inverse forms. Here, the radial distance of the contour or a floor of the contour to the axis of rotation of a respective roller is not constant, wherein the respective contour is provided for forming the coupling arm. By way of example, according to FIG. 9, a contour K31 can be provided on roller W3A and roller W3B, in order in particular to form or preform the spherical ball surface 31 and also the underlying throat portion 240. A further contour K25 on the rollers W3A and W3B serves, by way of example, to form the ball neck 250 and the transition to the end region 25 of the arm body 26. The representation is schematic and should therefore be taken as an example.

Through this careful and uniform treatment of the blank R2, in particular while it is still in the hot, semi-hot or warm state, even and substantially uninterrupted micro- or fibre structures form, by way of example in the manner of microstructure 155.

The invention claimed is:

1. A method for producing a trailer coupling for a motor vehicle, wherein the trailer coupling comprises a coupling arm, on the free end region of which a ball neck is formed, on which a coupling ball is arranged for attaching a trailer or coupling a load carrier to the motor vehicle, wherein the coupling ball is spherical on the side thereof facing away from the ball neck and has a spherical segment plane on the side thereof facing the ball neck, wherein between the spherical segment plane and a portion of the ball neck which has a smaller outer circumference than the spherical segment plane there is arranged a throat portion immediately below the spherical segment plane, the throat portion having a transition contour extending in a concave manner between the ball neck and the spherical segment plane, the transition contour transitioning with a coupling ball transition region into an external contour of the coupling ball, and transitioning with a ball neck transition region into an outer surface of the ball neck, and deformation a blank to form the throat portion such that the transition contour has a curved configuration with a non-constant radius and wherein the transition contour transitions tangentially or without an angle into the spherical segment plane and during the deformation of a microstructure of the blank, a region of the throat portion of the blank is completely or substantially deformed and not interrupted.

2. The method for producing a trailer coupling according to claim 1, wherein the coupling arm includes an arm body and the arm body, has at least one bend and/or one curved portion for matching to a bodywork contour or bumper contour of the motor vehicle and/or in that the arm body has a substantially non-circular cross section and/or in that the arm body at least directly next to the ball neck has a larger cross-sectional area than the ball neck.

3. The method for producing a trailer coupling according to claim 1, wherein in the spherical segment plane a ring surface area is provided, the external diameter of which adjoins the spherical ball surface of the coupling ball and the internal diameter or inner circumference of which adjoins the coupling ball transition region or transitions into the coupling ball transition region.

4. The method for producing a trailer coupling according to claim 1, wherein in the spherical segment plane a flat surface is provided or present.

5. The method for producing a trailer coupling according to claim 1, wherein the coupling ball transition region has a recess extending behind the spherical segment plane away from the ball neck.

6. The method for producing a trailer coupling according to claim 1, wherein the spherical segment plane is at right-angles to a longitudinal axis of the ball neck.

7. The method for producing a trailer coupling according to claim 1, wherein the transition contour has a curved configuration with precisely two, three or four radii that differ from one another.

* * * * *